United States Patent [19]

Bagby

[11] 3,951,354
[45] Apr. 20, 1976

[54] FISHING REEL LOADING AND UNLOADING DEVICE

[76] Inventor: James A. Bagby, R.R. No. 2, Box 36A, Greenville, Ky. 42345

[22] Filed: Feb. 11, 1975

[21] Appl. No.: 549,045

[52] U.S. Cl.............................. 242/129.8; 242/106
[51] Int. Cl.².................. B65H 49/00; A01K 89/00; A01K 89/02
[58] Field of Search.......... 242/129.8, 54 R, 84.1 R, 242/84.5 R, 106; 43/20, 22, 25

[56] References Cited
UNITED STATES PATENTS

| | | | |
|---|---|---|---|
| 2,899,148 | 8/1959 | Brainard | 242/129.8 |
| 3,026,059 | 3/1962 | Dennler | 242/84.5 R |
| 3,295,787 | 1/1967 | Golonka | 242/129.8 |
| 3,776,485 | 12/1973 | Foley et al. | 242/106 |

OTHER PUBLICATIONS

Sears Roebuck & Co. Boating and Fishing Catalog, copyright 1974, pp. 55, "Line Winder."

Primary Examiner—Leonard D. Christian
Attorney, Agent, or Firm—Lane, Aitken, Dunner & Ziems

[57] ABSTRACT

A fishing reel loading and unloading device by which a line supply spool is supported for universal positioning relative to a rod carried fishing reel. The line spool is supported on a one-piece spindle supported either for rotation or non-rotation on its axis and equipped with a crank means for rotating an empty line supply spool carried thereon as during unloading a fishing reel.

8 Claims, 6 Drawing Figures

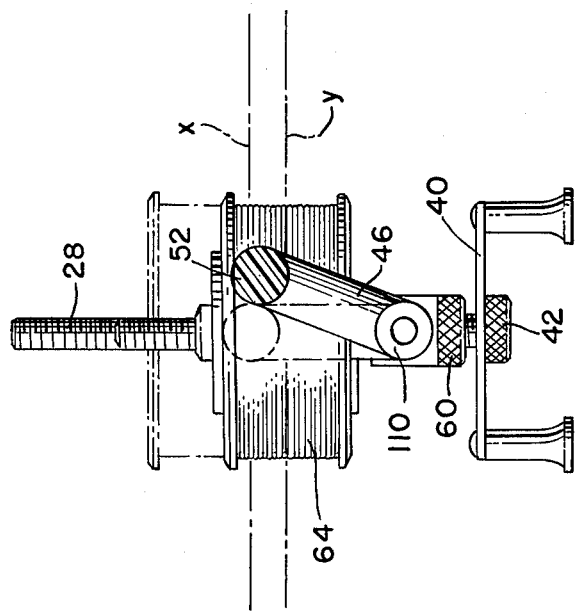
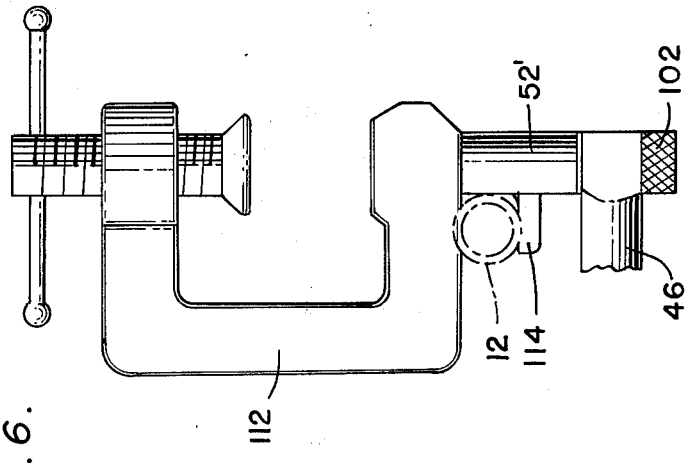
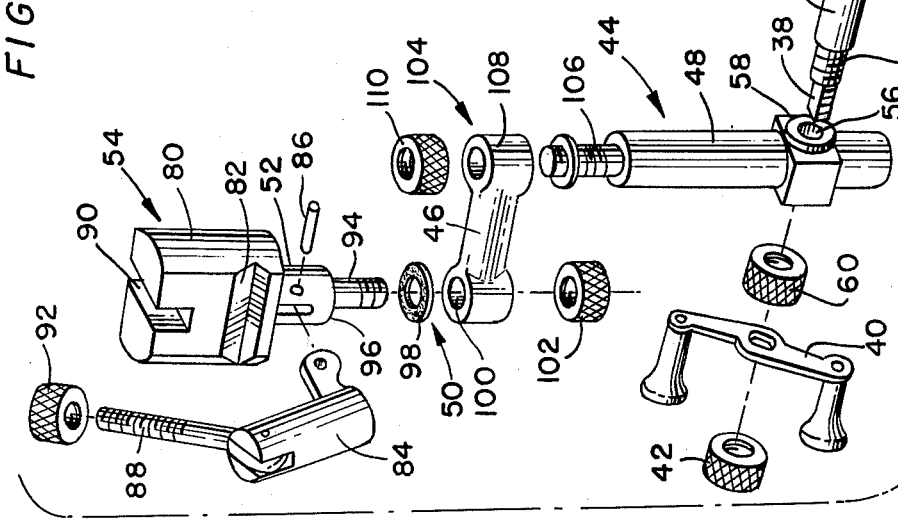
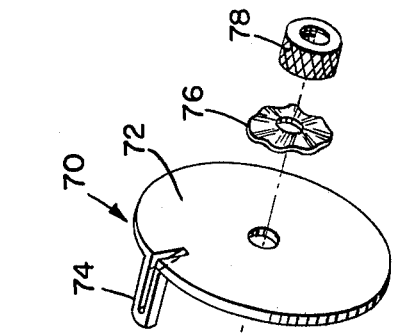
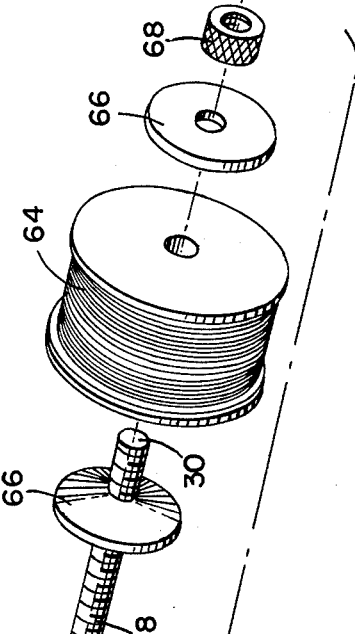
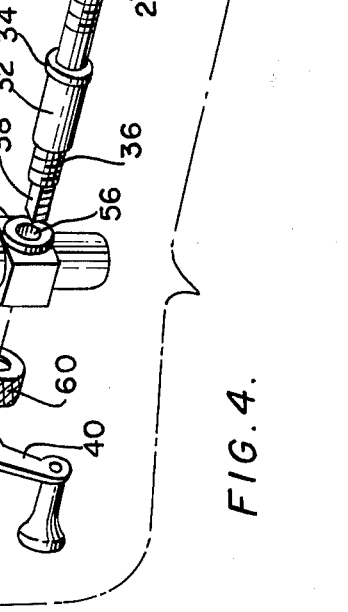

FISHING REEL LOADING AND UNLOADING DEVICE

BACKGROUND OF THE INVENTION

This invention relates to fishing reel loading and unloading devices and more particularly, it concerns an improved device for supporting any of several sizes of line spools on which fishing line is conventionally supplied in proper position for loading or unloading various types of fishing reels without twisting the line.

The average sports fisherman is aware of the importance of loading a reel with line free of twist in order to avoid line tangling in bait casting practice. Since fishing line is conventionally supplied on line spools having centrally apertured end flanges, conventional or level wind spools may be loaded very simply without twisting the line by supporting the supply spool for rotation on an axis parallel to the axis of the conventional reel and cranking the reel to transfer the line from the supply spool to the reel. However, if the reel to be loaded is a spinning reel in which the line is wrapped by a revolving bail about a stationary spool, the supply spool from which the line is transferred must be aligned axially with the reel spool. Traditionally reel loading operations have required two people, one to wind the reel and one to hold the supply spool from which the line is being transferred to the spool. In loading conventional or level wind reels, for example, the person handling the supply spool may do so simply by inserting a pencil or other stick-like member through the apertures of the supply spool and achieve the desired tension in the line as it is payed onto the reel by using his fingers to impose a drag against rotation of the supply spool on the pencil or other spindle device.

In the loading of spinning reels, however, where the supply spool must be held stationary and in axial alignment with the reel being loaded, considerable manual dexterity is required by the person holding the supply spool to allow the line to be payed axially off of the supply spool under any drag. For this reason and also to avoid the need for an assistant in loading spinning reels, line spool supports have been commercially available and which function to support a line spool from a fishing rod in axial alignment with the spool of a spinning reel also supported from the fishing rod. Such devices may include a revolving bail by which appropriate tension is imparted to the line as it is being loaded onto the spinning reel but in general, no provision is made for unloading line from the reel. As a result, a fisherman faced with a situation in which he must change the line on his reel, must discard the line previously loaded on his reel in order to load the new line.

A highly sophisticated reel loading and unloading apparatus is disclosed in U.S. Pat. No. 3,026,059 issued on Mar. 20, 1962 to G. F. Dennler. The apparatus disclosed in the Dennler patent is particularly well suited for both loading and unloading both spinning reels and level wind or conventional reels by virtue of a rod mounted swiveling post or standard from which a line spool spindle may be supported either in axial alignment with a spinning reel or axially parallel with a level wind or conventional casting reel. Also a crank is provided by which the empty line spools may be used for reel unloading operations. The principal difficulty with the apparatus of the type disclosed in the Dennler patent is that it represents a relatively complicated assembly of components adding both to manufacturing costs and complex manual adjustment during use.

SUMMARY OF THE PRESENT INVENTION

In accordance with the present invention an improved reel loading and unloading device is provided in which a one-piece spindle with a threaded free end to extend through a line spool is supported by a journal near the other end thereof received in a bearing aperture in one leg of an L-shaped standard. The other leg of the standard is mounted for swiveling movement with respect to a supporting post portion depending from a mounting clamp capable of being secured to a suitable support such as a fishing rod, for example. The spindle journal is separated from the line spool receiving end thereof by a flange and extends through the bearing aperture in the one leg of the L-shaped standard to receive a clamping nut by which the spindle may be either retained against rotation with respect to the mounting bracket or allowed to rotate on its own axis by manual actuation of a crank secured to the journal end of the spindle. An optional rotating bail may be placed over the spool receiving end of the spindle and secured by adjustable friction means to regulate the tension of line payed axially from a supply spool such as during loading a spinning reel. The L-shaped configuration of the standard coupled with the length of the leg connected to the mounting clamp post will enable the line spool to be centered either axially or transversely with respect to a reel mounted on a rod to which the device may be clamped. Further centering adjustment of the line supply spool may be achieved by another swivel joint at the juncture of legs establishing the L-shaped standard. Knurled thumb nuts of the same size are used for locking all relatively rotatable components including the swivel joints, the rotation or non-rotation of the spindle on its own axis, as well as tensioning adjustment of a revolving bail.

Accordingly, among the objects of the present invention are: the provision of an improved fishing reel loading and unloading device; the provision of such a device by which a line supply spool may be properly positioned for loading all types of fishing reels without twisting the line during the loading operation; the provision of such a device by which an empty line spool may be accurately and easily centered with respect to a rod mounted reel for unloading the reel; the provision of such a device which requires a minimal number of parts and by which the use of multiple common components is facilitated; and the provision of such a reel loading and unloading device which is extremely versatile in its application and yet simply constructed to facilitate both low cost manufacture and ease of adjustment during use.

Other objects and further scope of applicability will become apparent to those skilled in the art from the detailed description to follow taken in conjunction with the accompanying drawings in which like reference numerals designate like parts.

BRIEF DESCRIPTION OF THE DRAWINGS

FIG. 4 is an exploded perspective view illustrating the component parts of the improved device of the invention;

FIG. 5 is a cross-section taken on line 5—5 of FIG. 3; and

FIG. 6 is a side elevation illustrating a modified mounting clamp for the device of this invention.

DETAILED DESCRIPTION OF THE PREFERRED EMBODIMENTS

Figure 1:
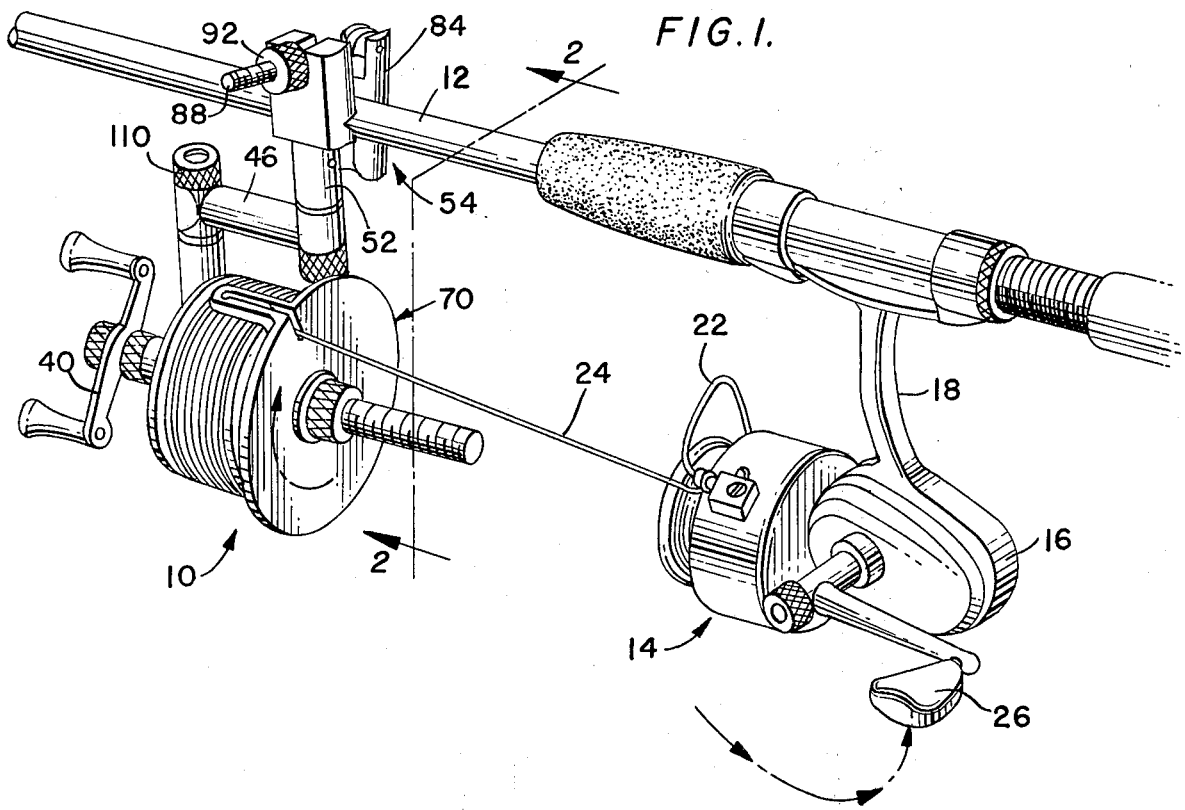
FIG. 1 is a fragmentary perspective view illustrating the loading of a fishing rod attached spinning reel with lines payed from a commercial fishing line spool supported on the improved device of the present invention.
Figure 2:
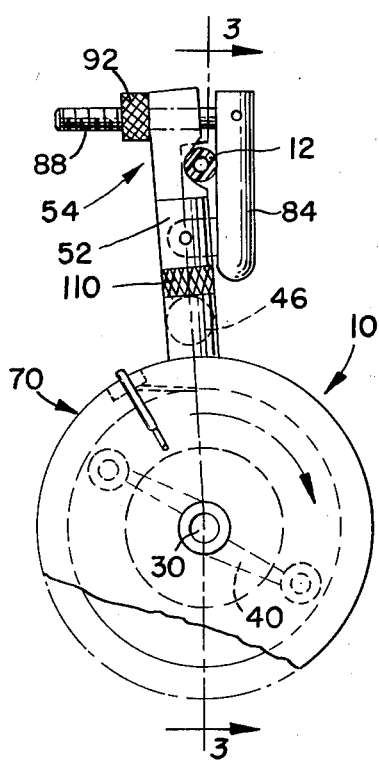
FIG. 2 is a fragmentary cross-section taken on line 2—2 of FIG. 1.
Figure 3:
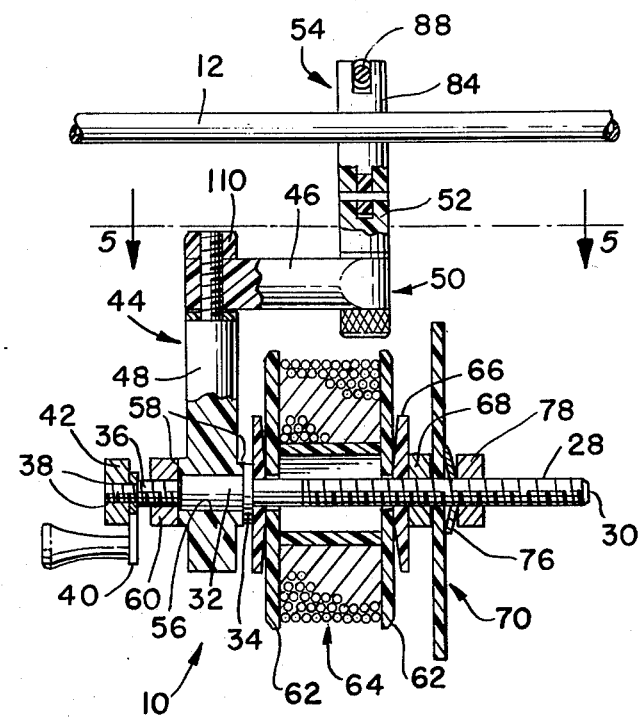
FIG. 3 is a cross-section taken on line 3—3 of FIG. 2.

In FIGS. 1-3 of the drawings, a preferred embodiment of the reel loading and unloading device of the present invention is generally designated by the reference numeral 10 and shown attached to a conventional fishing rod 12 to which a spinning reel 14 is affixed in a customary manner. The spinning reel 14 is of a standard commercially available type and as such includes a drive housing 16 depending from a mounting strut 18, a fixed spool 20 disposed on an axis parallel to the longitudinal axis of the fishing rod 12, a revolving bail 22 operative to wrap line 24 about the spool 20 upon actuation of a crank 26.

The structural organization of the loading and unloading device 10 is illustrated most clearly in FIGS. 3 and 4 of the drawings to include an elongate threaded spindle 28 having a free end 30 projecting from a journal 32 near its opposite end and spaced axially from the threaded spindle portion by an integral flange 34. Projecting from the journal end opposite the spindle 28 is another threaded portion 36 having flats 38 at its end to receive a crank 40 secured by suitable means such as a nut 42.

The spindle is supported by a standard 44 having an inverted L-shaped configuration to establish first and second legs 46 and 48, respectively. The first leg 46 is connected at its free end by lockable swivel means 50 at right angles to the axis of a post portion 52 depending from a rod mounting clamp 54. A bearing aperture 56 rotatably receives the spindle journal 32 near the extending or free end of the second leg 48. The bearing aperture 56 is located in a boss portion establishing opposed radial faces 58 so that the spindle may be braked against rotation by tightening a thumb nut 60 and the flange 34 against the radial faces 58.

The threaded spindle 28 is dimensioned to extend through centrally apertured end flanges 62 of a conventional line spool 64 on which fishing line is traditionally supplied by commercial sources. Such spools may vary in length and also in terms of end flange aperture size. Since in all applications of the loading and unloading device 10, the spool is retained against rotation with respect to the spindle 28, a pair of clamping washers 66 are received on the spindle and drawn against the flange 34 as well as opposite end flanges of the spool 64 by a knurled thumb nut 68. A revoluble bail 70 in the form of a centrally apertured disc 72 having an axially extending guide portion 74 is rotatably supported on the spindle 28. A friction washer 76 retained by a knurled thumb nut 78 on the threaded portion of the spindle 28 is provided to regulate the freedom of rotation of the bail about the axis of the spindle 28. The bail 70 is not used in some applications of the device 10 and therefore may be removed or replaced without in any way requiring adjustment of the other components of the device.

A complete understanding of component detail may be gained by reference to the exploded perspective view in FIG. 4 of the drawings. As shown in this figure, the rod mounting clamp 54 includes a base portion 80 molded integrally with the post portion 52 and which is oblong in configuration to enable an elongated rod notch 82 to be formed in one face thereof. A generally L-shaped clamping jaw 84 is pivotally connected by a pin 86 to the post portion 52 at one end and carries a swivel bolt 88 at the other end to be secured in an open slot 90 in the base portion 80 by a knurled clamping nut 92.

The swivel joint 50 is established by a threaded pintle 94 depending coaxially from the bottom of the post portion 52, the pintle 94 being of reduced diameter to establish a downwardly facing ledge 96. The pintle 94 extends through a friction washer 98 and into a bearing eye 100 of the first leg 46 of the L-shaped standard 44. Thus it will be appreciated that angular movement of the leg 46 about the axis of the pintle 94 may be permitted or prevented by loosening or tightening a knurled thumb nut 102 against the friction washer 98 and the shoulder 96.

Although it is contemplated that in certain applications, the legs 46 and 48 of the L-shaped standard 44 may be integrally formed, it is preferred that the legs be secured at their juncture by a second swivel joint 104 for reasons which will become apparent from the further description to follow. The swivel joint 104 is identical in all respects with the swivel joint 50 and as such includes a pintle 106 of reduced diameter extending from the leg 48 through an eye 108 at the other end of the leg 46 from the eye 100 and secured or released by a knurled thumb nut 110. It will be noted that the axes of the eyes 100 and 108 at opposite ends of the leg 46 extend in parallel relation to one another and thus function to retain the axes of the post portion 52 and leg 48 in parallel relation to each other. Also in this respect, the organization of the bearing aperture 56 and the journal 32 will retain the axis of the spindle 28 in a plane parallel with a plane containing the leg 46 or perpendicular to the axes of both the post portion 52 and the standard leg 48.

In the operation of the loading and unloading device 10 to transfer the fishing line 24 from the spool 64 to the spool 20 of the reel 14, the spool 64 is first mounted on the spindle 28 and held against rotation with respect to the spindle by tightening the thumb nut 68. Thereafter the revoluble bail 70 may be placed over the free end 30 of the spindle and secured by tightening the nut 78 against the spring washer 76 until the desired freedom of rotation is achieved. The line 24 is threaded through the guide portion 74 of the bail and secured to the spool 20 of the reel. By proper adjustment of the swivel joint 50, the axis of the spindle 28 and thus of the spool 64 may be aligned with the axis of the reel spool 20. Also during this operation, the brake nut 60 is tightened to prevent rotation of the spindle 28 on its axis. Thereafter the crank of the reel 26 is merely operated to wind the line 24 onto the spool 20 without any twist imparted to the line.

In unloading the reel 14, an empty line supply spool is mounted in the same manner on the spindle 28 and the thumb nut 60 loosened to allow rotation of the spindle thus of the spool on its own axis by operation of the crank 40. In this operation, the bail 70 need not be used. The swivel joint 50, however, is adjusted so that the axis of the spindle and the spool is perpendicular to the direction of line transfer. By operating the crank 40 and adjusting the drag (not shown) customarily provided on the reel 14, the line may be transferred from the reel spool 20 to the empty supply spool now on the device 10. It will be noted that because of the axial orientation of the spindle 28 and that of the reel spool 20 during this unloading operation, the line 24 will be wound onto the empty supply spool with a twist imparted therein. Although the twist will be of no consequence in the storage of the line on the spool, it could have adverse effects if it were not removed in the reloading of the reel with the twisted line. The twist may be removed, however, by appropriately marking the supply spool to designate the direction in which the line was wound and then reloading the reel spool 20 with the axis of the spindle 28 perpendicular to the axis of the spool 20 to remove the twist.

Also the unloading of line from the reel 20 is facilitated when the longitudinal center of the empty supply spool is aligned with the axis of the reel spool 20. In this respect, it is to be noted that spools on which fishing line is conventionally supplied are of different axial lengths. Further it will be appreciated that by selecting a length for the leg 46 corresponding to one-half the average length of spool will effect a rough measure of spool centering for the reel unloading operation. Precise longitudinal centering of the supply spool, irrespective of its length, may be achieved as a result of the second swivel joint 104 at the juncture of the legs 46 and 48. Specifically, and as shown in FIG. 5 of the drawings, the axial or longitudinal center of two spools of different lengths are designated by the reference lines x and y. Either of the axial centers represented by these reference lines may be brought into alignment with the axis of the spool 20 merely by loosening both thumb nuts 102 and 110 to achieve both proper angular adjustment of the axis of the spindle 28 and also centering of the spool 64 on the axis of the spool 20. The appropriate position may be secured simply by tightening both thumb nuts 102 and 110. Another advantage of the dual swivel joint is that by loosening both swivel joints, storage of the device in a tackle box, for example, is greatly facilitated.

In FIG. 6 of the drawing, an alternative form of mounting clamp for the line loading and unloading device of the present invention is shown. In this instance, the post portion designated 52' depends from the base of a C clamp 112 of dimensions appropriate for securement to a boat seat or gunwale (not shown). Also though not shown in FIG. 6, the remaining components of the device 10 are identical to those illustrated in FIGS. 1 through 5. Because of the requirement for reel alignment with the device, a rod positioning cleat 114 is provided on the post 52'. In this way, the fishing rod 12 to which the reel 14 is affixed in the manner shown in FIG. 1 is manually retained on the cleat 114 to establish reel positioning reference with respect to the device 10 when mounted independently of the rod using the clamp shown in FIG. 6.

Thus it will be appreciated that by this invention there is provided an unique, effective and low cost device by which line may be either loaded or unloaded from spinning reels, level wind reels or other forms of fishing reels without danger of twisting the line on the reel. Each of the components may be formed of relatively inexpensive material such as molded plastic or the like and the use of repetitive parts such as the several knurled thumb nuts is facilitated throughout. Furthermore, parts requiring adjustment during use are readily accessible and easily manipulated, a facility of significant importance to emergency line changing operations often incurred by fishermen.

It will be apparent to those skilled in the art that various changes and/or modifications may be made in the disclosed embodiments without departure from the inventive concepts manifested in those embodiments. Accordingly, it is expressly intended that the foregoing description is illustrative of preferred embodiments only, not limiting, and that the true spirit and scope of the present invention be determined by reference to the appended claims.

I claim:

1. Fishing reel loading and unloading apparatus for supporting and positioning a line spool with centrally apertured end flanges in operative relation to a rod mounted fishing reel, said apparatus comprising:
   a spindle for coaxially mounting the line spool and having a journal near one end thereof;
   means for clamping the line spool against rotation relative to said spindle;
   spindle supporting means including:
      a mounting clamp having a post portion extending therefrom, and
      an L-shaped standard having first and second legs, swivel means connecting said first leg at right angles to said post portion, swivel locking means for holding said first leg against swiveling movement after adjustment with respect to said post, said second leg having a bearing aperture for rotatably receiving said journal and to support said spindle so that the axis thereof lies in a plane spaced from but parallel to a plane containing said first leg;
   crank means connected to said spindle;
   releaseable brake means adjustable to hold said spindle against rotation or to allow rotation thereof by said crank means; and
   the length of said first leg approximating one-half the axial length of the line spool whereby either the axis of the spindle or the axial center of the spool thereon can be positioned approximately in a single reference plane containing the axis of the swivel by adjustment of said swivel.

2. The apparatus recited in claim 1 including another swivel means connecting said first and second legs of said L-shaped standard for adjustable rotation on an axis parallel to the axis of said first-mentioned swivel means.

3. The apparatus recited in claim 1 wherein said releaseable brake means comprises a threaded extension of said journal at said one end, a thumb nut on said threaded extension, and a flange on the other end of said journal which may be drawn against said second leg by tightening said thumb nut.

4. The apparatus recited in claim 3 wherein said crank means is mounted on said threaded extension.

5. The apparatus recited in claim 1 wherein said spindle is threaded and wherein said line spool clamping means comprises a pair of washers to engage opposite end flanges on the line spool and a thumb nut threadably engaged with said spindle.

6. The apparatus recited in claim 5 including a revolving bail receivable on said threaded spindle and variable friction means for retaining said bail against said thumb nut.

7. The apparatus recited in claim 1 wherein said mounting clamp includes means for attachment to a fishing rod.

8. The apparatus recited in claim 1 wherein said mounting clamp comprises a C clamp having a fixed clamping jaw and an adjustable clamping jaw, said post portion depending from said fixed jaw and including means for positioning a fishing rod in preestablished relation thereto.

* * * * *